H. A. CHASE.
Car Wheel.
No. 10,958.
Patented May 23, 1854.
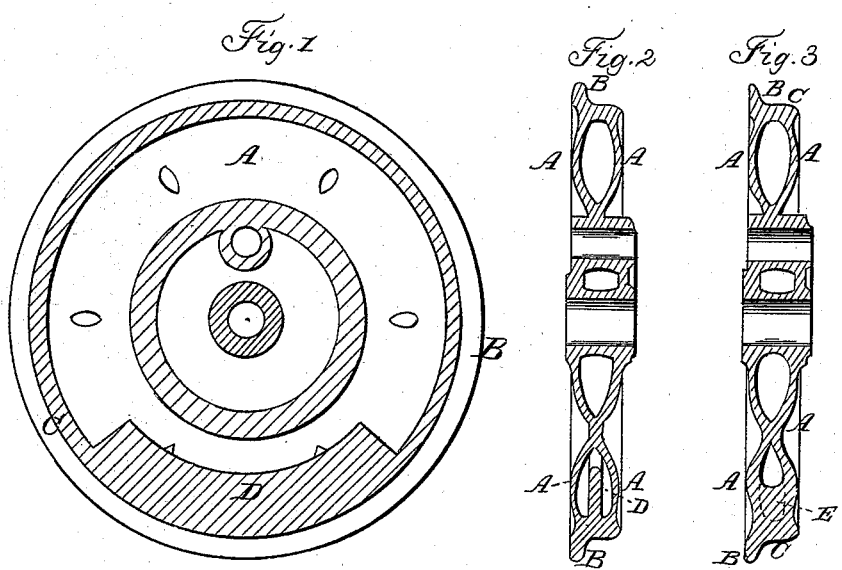

UNITED STATES PATENT OFFICE.

HENRY A. CHASE, OF BOSTON, MASSACHUSETTS.

COUNTERPOISE TO CAST LOCOMOTIVE-WHEELS.

Specification of Letters Patent No. 10,958, dated May 23, 1854.

*To all whom it may concern:*

Be it known that I, HENRY A. CHASE, of Boston, in the county of Suffolk and State of Massachusetts, have invented a new and useful Method of Casting a Counterbalance on Double-Plated Chilled Railroad Driving-Wheels; and I do hereby declare that the following is a full, clear, and exact description of the same, reference being had to the accompanying drawings, forming part of this specification, in which—

Figure 1, is a vertical longitudinal section of a chilled driving wheel having my improvement applied. Fig. 2, is a vertical transverse section of the same. Fig. 3, is a vertical transverse section of a similar wheel with the counterbalance cast on it in the ordinary way. This view is merely shown to illustrate my invention more fully.

Similar letters of reference in each of the several figures indicate corresponding parts.

The nature of my invention consists in casting the counterbalance upon the inner face of the tread of the wheel in such a manner that it will be free and independent of the two side plates forming the wheel and at the same time be supported by said tread in the most perfect manner, this method of casting the counterbalance rendering the two plates of the wheels equal in thickness over their whole surface, and consequently they expand or contract equally at all points, while the counterbalance is left free to expand to any extent, without exerting strain on those parts of the wheel which so commonly break during the casting process or while in use on account of the counterbalance being cast solid with the tread and side plates of the wheel, thus making additional surface and consequently causing unequal contraction or expansion at different points.

To enable others skilled in the art to make and use my invention I will proceed to describe its construction and application.

A, A, B and C, represent a hollow chilled driving wheel, of the ordinary construction, having my improvement applied to it, A, A, representing the two side plates, B, the flange and C the tread of the wheel.

D, is the counterbalance cast on the inner face of the tread C, and independent of the plates A, A, as seen in Figs. 1 and 2, and extending from the tread a short distance toward the center of the wheel, and as it is made thin and light it must be made to extend around the tread a suitable distance to give the required weight to counterbalance the wheel.

By examining Fig. 3 the ordinary counterbalance E, will be seen and by comparing it with my counterbalance D, Figs. 1 and 2, the utility of the latter will be apparent, for it will be understood that, if the counterbalance E, be employed, an additional solid surface is formed in the wheel and consequently unequal contraction or expansion and strain and breakage of the wheel at certain points will be experienced, whereas if the counterbalance D, be used no such result will be felt, for all the parts are free and independent and can expand without straining or injuring each other.

What I claim as my invention and desire to secure by Letters Patent, is—

Casting the counterbalance D, upon the inner face of the tread, C, of the wheel and independent of the two side plates A, A, forming the wheel, this method allowing all the parts of the wheel to expand or contract independent of the counterbalance, and the counterbalance itself to expand to any extent desired without exerting any strain on the wheel during the casting or chilling processes as herein fully set forth and described.

HENRY A. CHASE.

Witnesses:
WM. B. DORR,
MOSES JONES.